US009177481B2

(12) United States Patent
Wang et al.

(10) Patent No.: US 9,177,481 B2
(45) Date of Patent: Nov. 3, 2015

(54) SEMANTICS BASED SAFE LANDING AREA DETECTION FOR AN UNMANNED VEHICLE

(71) Applicant: Sikorsky Aircraft Corporation, Stratford, CT (US)

(72) Inventors: Hongcheng Wang, Farmington, CT (US); Ziyou Xiong, Wethersfield, CT (US); Jason C. Derenick, Hamden, CT (US); Christopher Stathis, Hamden, CT (US); Igor Cherepinsky, Sandy Hook, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 0 days.

(21) Appl. No.: 14/105,759

(22) Filed: Dec. 13, 2013

(65) Prior Publication Data

US 2015/0170526 A1     Jun. 18, 2015

(51) Int. Cl.
| G06F 19/00 | (2011.01) |
| G08G 5/02 | (2006.01) |
| G01S 17/02 | (2006.01) |
| G01S 17/88 | (2006.01) |
| G01S 17/89 | (2006.01) |

(Continued)

(52) U.S. Cl.
CPC *G08G 5/02* (2013.01); *B64C 19/00* (2013.01); *G01S 7/51* (2013.01); *G01S 17/023* (2013.01); *G01S 17/88* (2013.01); *G01S 17/89* (2013.01); *G06K 9/00624* (2013.01)

(58) Field of Classification Search
CPC ....... G01C 23/005; G01S 13/94; G01S 17/88; G01S 17/89; G01S 17/933; G01S 7/062; G01S 7/22; G01S 7/24

USPC ................. 701/27, 28, 16; 700/259
See application file for complete search history.

(56) References Cited

U.S. PATENT DOCUMENTS 5,436,839 A * 7/1995 Dausch et al. .................. 701/27
6,232,602 B1 * 5/2001 Kerr ............................. 250/330

(Continued)

FOREIGN PATENT DOCUMENTS

WO     2011109856 A1     9/2011

OTHER PUBLICATIONS

Cesetti, et al., "A Vision-Based Guidance System for UAV Navigation and Safe Landing using Natural Landmarks", J Intell Robot Syst, 2010, 25 pages.

(Continued)

*Primary Examiner* — Redhwan k Mawari
(74) *Attorney, Agent, or Firm* — Cantor Colburn LLP

(57) ABSTRACT

A method for determining a suitable landing area for an aircraft includes receiving signals indicative of Light Detection And Ranging (LIDAR) information for a terrain via a LIDAR perception system; receiving signals indicative of image information for the terrain via a camera perception system; evaluating, with the processor, the LIDAR information and generating information indicative of a LIDAR landing zone candidate region; co-registering in a coordinate system, with the processor, the LIDAR landing zone candidate region and the image information; segmenting, with the processor, the co-registered image and the LIDAR landing zone candidate region to generate segmented regions; classifying, with the processor, the segmented regions into semantic classes; determining, with the processor, contextual information in the semantic classes; and ranking and prioritizing the contextual information.

23 Claims, 3 Drawing Sheets

(51) Int. Cl.
 G01S 7/51 (2006.01)
 G06K 9/00 (2006.01)
 B64C 19/00 (2006.01)

(56) References Cited

U.S. PATENT DOCUMENTS

| | | | |
|---|---|---|---|
| 6,952,632 | B2 | 10/2005 | Robert et al. |
| 7,512,583 | B2* | 3/2009 | Benson et al. .................. 706/59 |
| 7,894,675 | B2 | 2/2011 | Wiedemann et al. |
| 8,244,415 | B1 | 8/2012 | Greenleaf et al. |
| 2012/0029869 | A1 | 2/2012 | Muensterer et al. |
| 2012/0314032 | A1* | 12/2012 | Muensterer et al. ............ 348/46 |
| 2013/0282208 | A1* | 10/2013 | Mendez-Rodriguez et al. ............................... 701/16 |

OTHER PUBLICATIONS

Fitzgerald, et al., "A Vision Based Emergency Forced Landing System for an Autonomous UAV", In Proceedings Australian International Aerospace Congress Conference, 2005 (Ph.D. thesis), 27 pages.
Guan, Haiyan, et al., "Support vector machine for urban land-use classification using lidar point clouds and aerial imagery", 2011, 8 pages.
Howard, A. and Seraji, H., "Multi-sensor terrain classification for safe spacecraft landing, IEEE Transactions on Aerospace and Electronic Systems", IEEE Transactions on Aerospace and Electronic Systems, vol. 40, No. 4, Oct. 2004, pp. 1122-1131.
Kendoul, "Survey of advances in guidance, navigation, and control of unmanned rotorcraft systems", Journal of Field Robotics, vol. 29 Issue 2, 2012, 111 pages.
Micusik, et al., "Semantic parsing of street scenes from video", The International Journal of Robotics Research, 2012, 15 pages.
Patterson, et al., "Integration of Terrain Image sensing with UAV safety management protocols", LNICST, 2011, 16 pages.
Patterson, et al., "Towards autonomous safe landing site identification from colour aerial images", (In Press). 2010 Irish Machine Vision and Image Processing Conference, Limerick, Ireland, IEEE. 2010, 16 pages.
Posner, et al., "A generative framework for fast urban labeling using spatial and temporal context", Auton Robot (2009) 26: pp. 153-170.
Posner, et al., "Online generation of scene descriptions in urban environments", RAS, Jul. 7, 2008, 24 pages.
Sanfourche et al., "Perception for UAV: Vision-based navigation and environment modeling", Aerospace Lab Journal, Issue 4—May 2012, pp. 1-19.
Scherer, et al., "Autonomous landing at unprepared sites by a full-scale helicopter", Robotics and Autonomous Systems, 2012, 18 pages.
European Search Report for application EP 14197306.5, dated May 15, 2015, 8 pages.

* cited by examiner

SEMANTICS BASED SAFE LANDING AREA DETECTION FOR AN UNMANNED VEHICLE

BACKGROUND

The subject matter disclosed herein relates generally to the field of unmanned aerial vehicles and, more particularly, to a semantics based safe landing area detection algorithm for determining a safe landing area for an unmanned aerial vehicle.

DESCRIPTION OF RELATED ART

Unmanned aerial vehicles (UAV's), for example, fixed-wing and rotorcraft UAV's, are powered aircraft without a human operator. As such, UAV's provide advantages over manned aircraft by removing humans from situations which may be deemed dangerous, for example, during reconnaissance or during search and rescue operations during a natural disaster. Autonomous UAV's are a natural extension of UAV's and do not require real-time control by a human operator. Autonomous UAV's may be required to land on an unprepared site or unknown terrain without human assistance during mission operation or in an emergency and must be able to autonomously select a desirable landing site in order to be a viable and effective option in flight operations. Current art on autonomous landing area detection has focused on three-dimensional (3D) terrain based data acquisition modalities such as LIght Detection and Ranging scanners (LIDAR), LAser Detection and Ranging scanners (LADAR), RAdio Detection And Ranging (RADAR), and cameras for autonomous landing detection. However, only 3D information is not sufficient for autonomous operation of UAV's in the field. For example, for an emergency landing in complex scenarios, it may be difficult for UAVs to discriminate between a water surface, a grass field or a sand field from only the 3D information.

BRIEF SUMMARY

According to an aspect of the invention, a method for determining a suitable landing area for an aircraft includes receiving signals indicative of terrain information for a terrain via a 3D perception system; receiving signals indicative of image information for the terrain via a camera perception system; evaluating, with the processor, the terrain information and generating information indicative of a landing zone candidate region; co-registering in a coordinate system, with the processor, the landing zone candidate region and the image information; segmenting, with the processor, an image region corresponding to the landing zone candidate region to generate segmented regions, the landing zone candidate region being related to the co-registered image and the landing zone candidate region; classifying, with the processor, the segmented regions into semantic classes; determining, with the processor, contextual information in the semantic classes; and ranking and prioritizing the contextual information.

According to another aspect of the invention, a system for determining a suitable landing area for an aircraft includes a processor and memory having instructions stored thereon that, when executed by the processor, cause the system to: receive signals indicative of terrain information for a terrain with a 3D perception system; receive signals indicative of image information for the terrain with a camera perception system; evaluate the terrain information and generate information indicative of a landing zone candidate region; co-register in a coordinate system the landing zone candidate region and the image information; segment the co-registered image and the landing zone candidate regions to generate segmented regions; classify the segmented regions into semantic classes; determine contextual information in the semantic classes; and ranking and prioritizing the contextual information.

Other aspects, features and techniques of the invention will become more apparent from the following description taken in conjunction with the drawings.

BRIEF DESCRIPTION OF THE SEVERAL VIEWS OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which like elements are numbered alike in the several FIGURES:

DETAILED DESCRIPTION

Embodiments of a system and method for a semantics-based Safe Landing Area Detection (SLAD) algorithm include receiving raw data from multiple modalities and processing the raw data by segmentation and feature extraction. Also, image information is classified and a contextual model is applied to ascertain errors in the classification. Further, the semantic classes are prioritized and ranked to determine a safe landing area.

Figure 1:
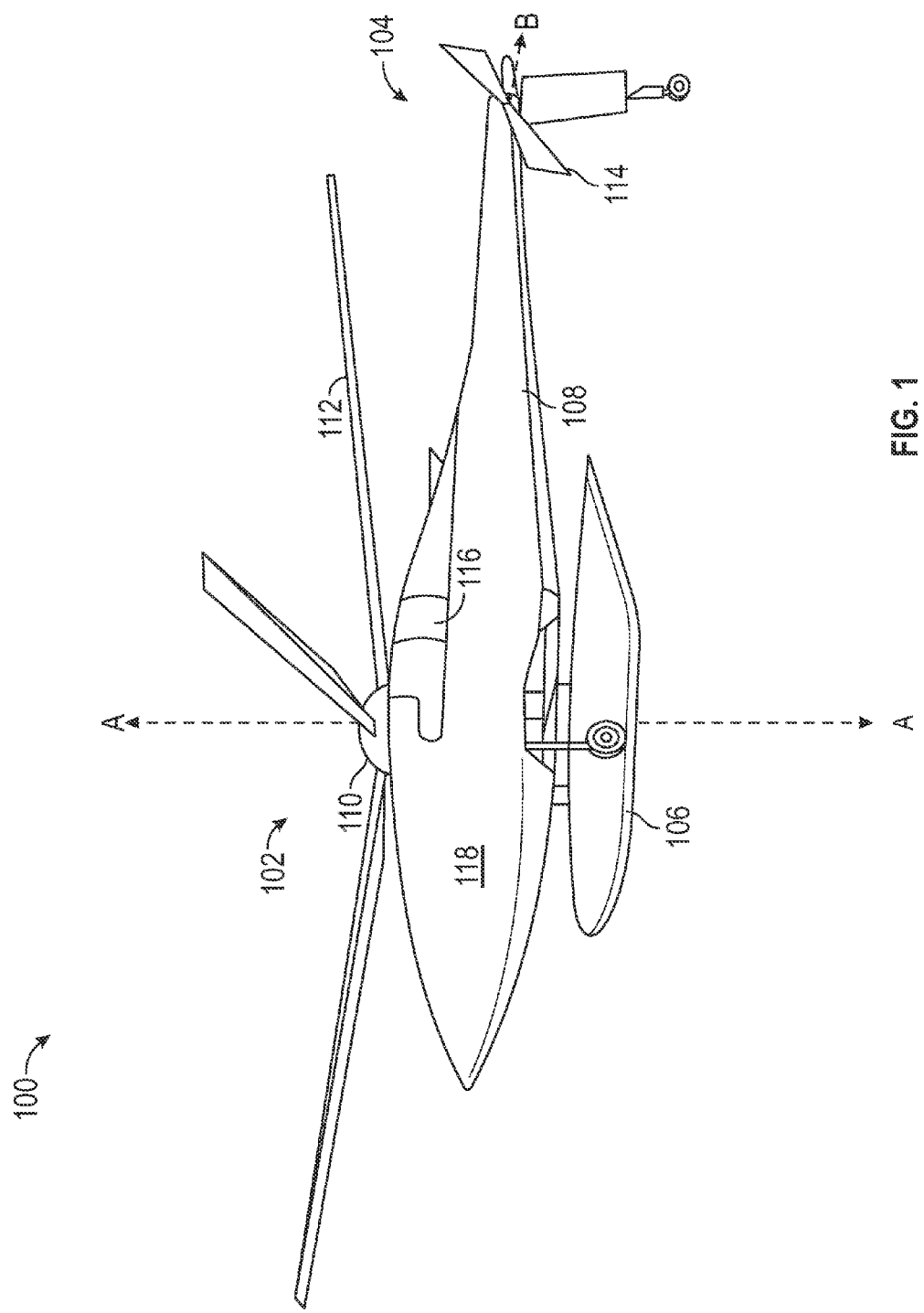
FIG. 1 is a perspective view of an exemplary rotary wing UAV aircraft according to an embodiment of the invention.

Referring now to the drawings, FIG. 1 illustrates a perspective of an exemplary vehicle in the form of an autonomous rotary-wing unmanned aerial vehicle (UAV) 100 (or "autonomous UAV 100") for implementing the SLAD algorithm according to an embodiment of the invention. As illustrated, the autonomous UAV 100 includes a main rotor system 102, an anti-torque system, for example, a tail rotor system 104 and a perception system 106. The main rotor system 102 is attached to an airframe 108 and includes a rotor hub 110 having a plurality of blades 112 that rotate about axis A. Also, the tail rotor system 104 is attached aft of the main rotor system 102 and includes a plurality of blades 114 that rotate about axis B (which is orthogonal to axis A). The main rotor system 102 and the tail rotor system 104 are driven to rotate about their respective axes A, B by one or more turbine engines 116 through gearboxes (not shown). Although a particular configuration of an autonomous UAV 100 is illustrated as a rotary wing UAV and described in the disclosed embodiments, it will be appreciated that other configurations and/or machines include autonomous and semi-autonomous vehicles that may operate in land or water including fixed-wing aircraft, rotary-wing aircraft, marine vessels (e.g., submarines, ships, etc.), and land vehicles (e.g., trucks, cars, etc.) may also benefit from embodiments disclosed.

The autonomous UAV 100 includes an aircraft computer 118 having one or more processors and memory to process sensor data acquired from the perception system 106. Also, the perception system 106 is attached to the airframe 108. Perception system 106 includes sensors associated with one or more remote image acquisition devices for capturing data from a terrain and for processing by the flight computer 118 while the autonomous UAV 100 is airborne. In an embodiment, the perception system 106 may include a multi-modal perception system such as a downward-scanning LIDAR scanner, a color video camera, a multi-spectral camera, a stereo camera system, Structure light based 3D/depth sensor, Time-of-flight 3D camera, RADAR, and/or a Time-of-Flight (TOF) camera or the like in order to capture terrain data for implementing the semantics based SLAD algorithm. The aircraft computer 118 processes, in one non-limiting embodiment, raw LIDAR data acquired through, for example, sensors associated with a 3-D LIDAR scanner based modality in order to implement the semantics-based SLAD algorithm while airborne. In other embodiments, a 3D LIDAR-based perception system or the like may be implemented without departing from the scope of the invention. Additionally, autonomous UAV 100 may include an internal navigation unit such as, for example, an Inertial Measurement unit (IMU) that may be used to acquire positional data related to a current rotation and acceleration of autonomous UAV 100 in order to determine a geographic location of autonomous UAV 100 including a change from the initial position of autonomous UAV 100. Additional navigation systems such as, GPS or the like may be provided to enhance the positional awareness of autonomous UAV 100.

Figure 2:
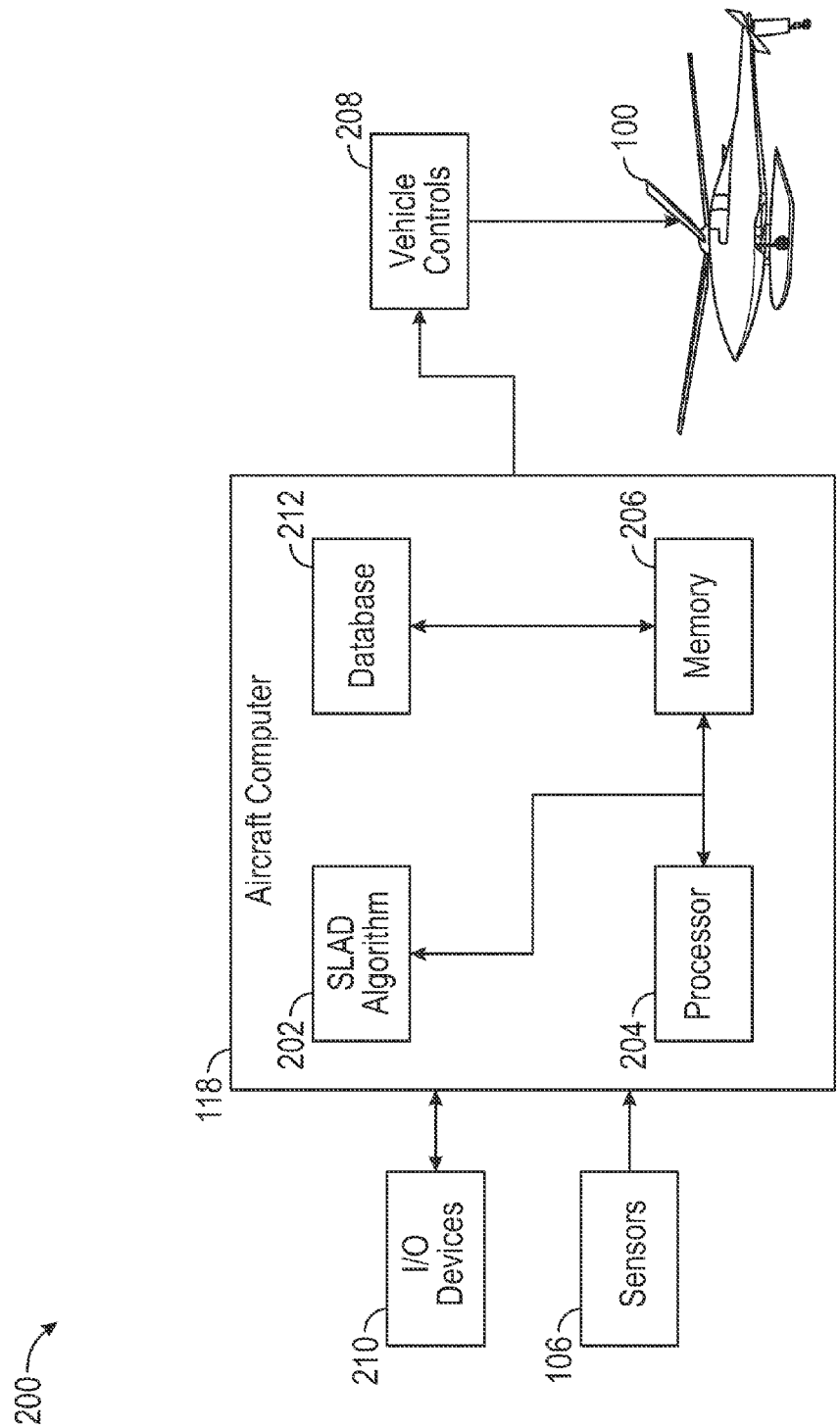
FIG. 2 is a schematic view of an exemplary computing system according to an embodiment of the invention.

FIG. 2 illustrates a schematic block diagram of a SLAD system 200 on board the autonomous UAV 100 according to an exemplary embodiment. As illustrated, the SLAD system 200 includes the aircraft computer 118 that executes instructions for implementing the SLAD algorithm 202. The aircraft computer 118 receives raw sensor data on a landing area from one or more sensors that are associated with perception system 106 (FIG. 1). The computer 118 includes a memory 206 that communicates with a processor 204. The memory 206 may store the SLAD algorithm 202 as executable instructions that are executed by processor 204. The instructions may be stored or organized in any manner and at any level of abstraction, such as in connection with the execution of the SLAD algorithm 202. The processor 204 may be any type of processor (such as a CPU or a GPU), including a general purpose processor, a digital signal processor, a microcontroller, an application specific integrated circuit, a field programmable gate array, or the like. In an embodiment, the processor 204 may include an image processor in order to receive images and process the associated image data using one or more processing algorithms to produce one or more processed signals. In an embodiment, the processor 204 may include a LIDAR processor in order to receive LIDAR data and process the associated 3D point cloud data using one or more processing algorithms to produce one or more processed signals. Also, in embodiments, memory 206 may include random access memory (RAM), read only memory (ROM), or other electronic, optical, magnetic or any other computer readable medium onto which is stored the mixing algorithm described below.

The system 200 may include a database 212. The database 212 may be used to store inertial navigational data that may be acquired by IMU including operating conditions of the autonomous UAV 100 (FIG. 1) such as, for example, lateral acceleration, attitude, and angular rate, magnitude and direction of wind speed relative to autonomous UAV 100. Also, sensor data acquired on a landing zone by, for example, 3D-LIDAR, and/or any feature data from reference images that may be used by SLAD algorithm 202 may be stored in database 212. The data stored in the database 212 may be based on one or more other algorithms or processes for implementing SLAD algorithm 202. For example, in some embodiments data stored in the database 212 may be a result of the processor 204 having subjected data received from the perception system 106 to one or more filtration processes. The database 212 may be used for any number of reasons. For example, the database 212 may be used to temporarily or permanently store data, to provide a record or log of the data stored therein for subsequent examination or analysis, etc. In some embodiments, the database 212 may store a relationship between data, such as one or more links between data or sets of data acquired through the modalities on board autonomous UAV 100.

The system 200 may provide one or more controls, such as vehicle controls 208. The vehicle controls 208 may provide directives based on, e.g., data associated with an internal navigation system such as the IMU. Directives provided by the vehicle controls 208 may include navigating or repositioning the autonomous UAV 100 to an alternate landing zone for evaluation as a suitable landing zone. The directives may be presented on one or more input/output (I/O) devices 210. The I/O devices 210 may include a display device or screen, audio speakers, a graphical user interface (GUI), etc. In some embodiments, the I/O devices 210 may be used to enter or adjust a linking between data or sets of data. It is to be appreciated that the system 200 is illustrative. In some embodiments, additional components or entities not shown in FIG. 2 may be included. In some embodiments, one or more of the components or entities may be optional. In some embodiments, the components or entities of the system 200 may be arranged or configured differently from what is shown in FIG. 2. For example, in some embodiments the I/O device(s) 210 may be commanded by vehicle controls 208, as opposed to being commanded by processor 204 as shown in FIG. 2.

Figure 3:
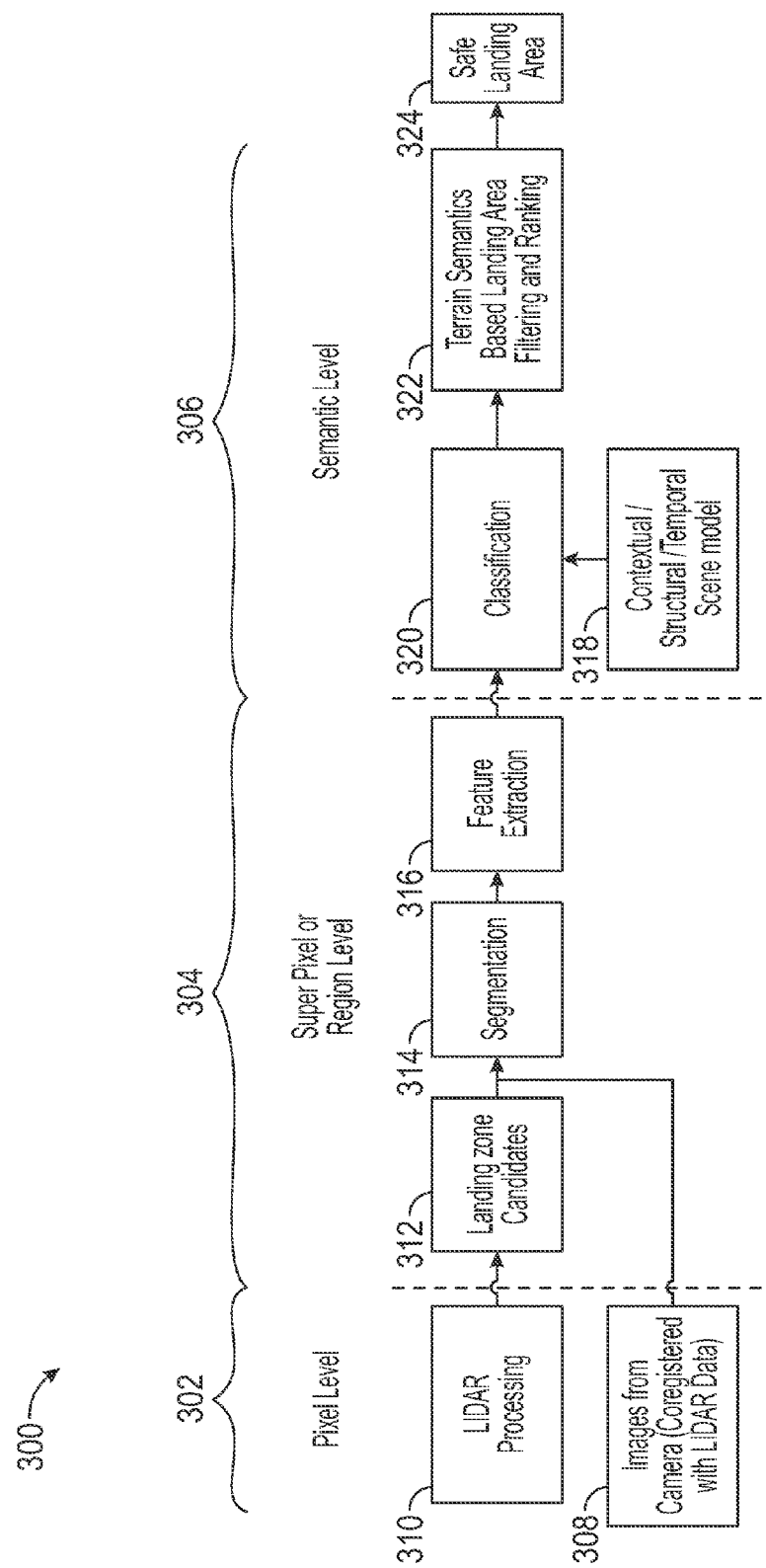
FIG. 3 illustrates a dataflow diagram of a safe landing detection algorithm according to an embodiment of the invention.

FIG. 3 illustrates an exemplary data flow diagram 300 that is performed by processor 204 for implementing the SLAD algorithm 202 according to an embodiment of the invention. Particularly, data flow diagram 300 depicts a plurality of phases that represent a semantics-based approach using multiple modalities for implementing the SLAD algorithm 202. The plurality of phases include a pixel level phase 302, a super pixel phase 304, and a semantic phase 306 for evaluating a landing zone or terrain with the autonomous UAV 100 (FIG. 1).

The pixel level phase 302, as illustrated, includes LIDAR processing through a LIDAR module 310 during a coarse evaluation of a landing zone. In this phase 302, raw LIDAR data is acquired of the terrain as 3D point cloud data and processed as a plurality of multiple cells of a predefined size, e.g., a 2 square-meter (2 $m^2$), in LIDAR module 310 to generate a 2.5 D elevation map. In landing zone candidate module 312, coarse evaluation is also performed whereby a LIDAR terrain grid (or 2.5 D low-resolution elevation map) having a plurality of multiple cells of a predefined size is generated for the terrain from the 3D point-cloud LIDAR data. Each cell in the LIDAR terrain grid is processed for a set of statistics (i.e. compute coarse features for each cell) that is used to evaluate a particular terrain. For example, each cell in the LIDAR terrain grid is evaluated for its slope, residual of fitting, and variance of height by applying a mathematical operation. For example, a fast algorithm to determine a linear least squares fit along dimension z is applied to each cell to evaluate the slope, residual of fitting, as well as the variance of height. The least squares fitting algorithm may generate terrain information that is a collection of connected components, each component being a cell that has had good fitting, i.e., flat slope, low residual, and low variance of height. The likelihood of a cell belonging to a landing zone candidate is updated online by processor 204. The contextual information of neighborhood cells is considered for continuity. The connected components are polygons that represent landing zone information (i.e., x, y locations) in LIDAR. After culling or removing the rejected cells in the LIDAR terrain grid that do not meet certain variance criteria, the connected components are identified as LIDAR landing zone candidate regions and sent to segmentation module 314 for co-registration with raw image data in the super pixel phase 304.

In an embodiment, the 3D point cloud data may be further processed in landing zone candidate module 312 through a triangulation algorithm having a 3D model of the autonomous UAV 100 for the landing zone candidates. For example, a 3D model of the autonomous UAV 100 may be used in a 2D Delaunay triangulation algorithm in order to determine the "goodness" of a particular landing zone previously identified through the LIDAR processing module 310. For example, the Delaunay triangulation algorithm may be used to calculate a volume between an undersurface of the 3D model for the autonomous UAV 100 with respect to data points in the image. The 2D Delaunay triangulation as applied to a sampling of points from the undercarriage may be used in order to determine whether the 3D model will result in bad contact of the autonomous UAV 100 in particular landing zone as represented by the image.

Fine evaluation is performed in module 308 during the pixel level phase 302 with image data acquired through the camera. Particularly, signals indicative of raw image data (i.e., 2D data) for the landing zone is acquired from at least one camera in data module 308 and, in an exemplary embodiment, the raw camera data is generated by a color video camera. The raw image data in data module 308 is stored in database 212 for processing by processor 204. The image data is co-registered with LIDAR data from sensor calibration. The images may be low-quality due to the variations of lighting, and image enhancement algorithms such as edge-preserving de-noising, contrast enhancement and sharpening may be applied before further processing.

In module 308, LIDAR landing zone candidate regions are co-registered with the corresponding image data that was processed from the camera including generating visible or multi-spectral image data from the image information. Co-registration is performed in order to map regions in the image data against the 3D LIDAR terrain grid (i.e., points in the 2D image map have a corresponding point in the 3D LIDAR terrain grid) generated in the LIDAR module 310 and landing zone candidate module 312. Candidate landing sites that have been identified as landing zone candidate regions in 3D LIDAR terrain grid are retained as potentially good landing zone candidate regions (x, y locations) in the corresponding 2D image from the camera.

Next, signals indicative of potentially good landing zone candidate regions identified by co-registration of the LIDAR landing zone region with the 2D image are evaluated by segmentation module 314 during a fine evaluation. In segmentation module 314, the 2D image for the landing zone candidate is segmented into meaningful, homogeneous segments. During segmentation 314, each image region for a landing zone candidate region is segmented into additional segments called superpixels based on visual features from the camera, depth features from LIDAR or both. The visual features in an image in the super pixel segment are processed on a graph with vertices for pixels and edges between pixels. The segmentation criterion is adjusted based on the degrees of variability in neighboring regions of the image. In an example, a landing zone candidate region is segmented into one or more superpixel regions. Further, the one or more superpixel regions are evaluated in feature extraction module 316 for defined features such as, in some non-limiting examples, color, texture, depth features or the like. The segmentation parameters, such as scale and minimum size of super pixels, are adaptively tuned based on contextual information of the autonomous UAV status such as, e.g., altitude.

In feature extraction module 316, multiple image features in a super pixel segment are extracted from the image content such as, for example, color, texture, appearance, or the like. Multiple 3D LIDAR features within the same segment are extracted from the LIDAR content such as, for example, slope and variance of planar fitting or the like. In embodiments, color is extracted using a RGB color space and a color histogram based method for a distribution of color vectors having 11 bins per channel is applied to the RGB color space in order to obtain a color feature from the image. In an embodiment, texture is represented as texton histogram, local binary pattern (LBP), a Scale-Invariant Feature Transform (SIFT) descriptor or similar algorithm in order to detect and identify contrast, coarseness, directionality, periodicity or the like in the images. Other embodiments include implementing steerable filters, color moments, Differential Invariant Feature algorithms, Principal Components Analysis-SIFT or complex filters. The appearance features from image, for example color, texture, and the 3D features from LIDAR, for example slope, variance of planar fitting are identified are sent to semantic level evaluation phase 306 for further processing.

Semantic level evaluation phase 306 includes contextual module 318, classification module 320 and semantics ranking module 322. Classification module 320 implements a classification algorithm in order to categorize images into semantic classes such as, for example, tree, road, sea, building, field, etc. Some classification algorithm may include Random Forest (RF), Support Vector Machines (SVMs), or dictionary learning based approaches. Additionally, spatial and temporal information in a contextual model is provided from the contextual module 318 in order to overcome classification errors in the semantic classes. In an embodiment, spatial and temporal information is provided as signals through a Markov Random Field (MRF) model or a rule-based model. The model defines how the semantic classes relate to a real world environment in order to define the relationship between semantic classes in an image and overcome errors from the classification algorithm in classification module 320. For example, tree in a sea would be classified as an error in classification module 320 based on semantic classes. Other contextual information may include weather condition (for example, winding directions), Geometric context, Metadata context (e.g., road map), etc. The semantic class information is refined and the refined semantic class information is provided as a signal to semantics ranking module 322 as a refined semantic class (also referred to as a contextual semantic class). The refined semantic class is ranked and prioritized based on a calculated or determined and application specific objective such as, for example, suitability of a landing zone for a specific operation or suitability during an emergency landing. In an example, the classes would be ranked, in order of high priority to low priority, road, grass, sand and building. Additionally, for an emergency landing, a grass class would have a higher priority than a sand class. The ranked classes and their priorities would then be provided to vehicle controls as a signal indicative of a safe landing area 324 which is suitable for landing.

The terminology used herein is for the purpose of describing particular embodiments only and is not intended to be limiting of the invention. While the description of the present invention has been presented for purposes of illustration and description, it is not intended to be exhaustive or limited to the invention in the form disclosed. Many modifications, variations, alterations, substitutions or equivalent arrangement not hereto described will be apparent to those of ordinary skill in the art without departing from the scope and spirit of the invention. Additionally, while the various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method for determining a suitable landing area for an aircraft, comprising:
   receiving signals indicative of terrain information for a terrain via a three-dimension (3D) perception system;
   receiving signals indicative of image information for the terrain via a camera perception system, the image information separate from the terrain information;
   evaluating, with the processor, the terrain information and generating information indicative of a landing zone candidate region;
   co-registering in a coordinate system, with the processor, the landing zone candidate region and the image information;
   segmenting, with the processor, an image region from the image information corresponding to the landing zone candidate region to generate segmented regions;
   classifying, with the processor, the segmented regions into semantic classes;
   determining, with the processor, contextual information from a contextual model and using the contextual information to detect an error in at least one semantic classes; and
   ranking and prioritizing the semantic classes.

2. The method of claim 1, wherein the receiving of the terrain information further comprises receiving the signals indicative of Light Detection And Ranging (LIDAR) terrain information for the terrain via a LIDAR perception system.

3. The method of claim 1, wherein the receiving of the terrain information further comprises receiving the terrain data as a 3D point cloud data.

4. The method of claim 3, wherein the evaluating of the terrain information further comprises evaluating the 3D point cloud data for at least a slope, a residual of fitting, and a variance of height from the terrain information.

5. The method of claim 4, wherein the evaluating of the 3D point cloud data further comprises identifying at least one of a slope, a residual of fitting, and a variance of height from the segmented regions.

6. The method of claim 1, wherein the co-registering further comprises receiving visible or multi-spectral image data from the image information.

7. The method of claim 1, further comprising adaptively segmenting the landing zone candidate region based on the aircraft status.

8. The method of claim 1, further comprising identifying at least one of a visual feature or a depth feature in the segmented regions.

9. The method of claim 8, wherein the identifying of the at least one of the visual or the depth feature further comprises identifying at least one of color, texture, and appearance from the image information or at least one of a slope, a residual of fitting, and a variance of height from the terrain information corresponding to each segmented region.

10. The method of claim 1, wherein the classifying of the segmented regions further comprises categorizing images in the segmented regions into the semantic classes.

11. The method of claim 1, further comprising determining a suitable landing zone from the prioritized ranked semantic classes.

12. The method of claim 1, wherein the ranking and prioritizing the semantic classes further comprises prioritizing the semantic classes based on one of priority or suitability.

13. A system for determining a suitable landing area for an aircraft, comprising:
   a processor; and
   memory having instructions stored thereon that, when executed by the processor, cause the system to:
      receive signals indicative of terrain information for a terrain with a three-dimension (3D) perception system;
      receive signals indicative of image information for the terrain with a camera perception system, the image information separate from the terrain information;
      evaluate the terrain information and generate information indicative of a landing zone candidate region;
      co-register in a coordinate system the landing zone candidate region and the image information;
      segment image regions corresponding to the landing zone candidate regions to generate segmented regions;
      classify the segmented regions into semantic classes;
      determine contextual information from a contextual model and using the contextual information to detect an error in at least one semantic class; and
      ranking and prioritizing the semantic class.

14. The system of claim 13, wherein the processor is configured to receive Light Detection And Ranging (LIDAR) terrain information for the terrain via a LIDAR perception system.

15. The system of claim 13, wherein the processor is configured to receive the terrain data as a 3D point cloud data.

16. The system of claim 13, wherein the processor is configured to evaluate the 3D point cloud data for at least one of a slope, a residual of fitting, and a variance of height from the terrain information.

17. The system of claim 13, wherein the processor is configured to receive visible or multi-spectral image data from the image information.

18. The system of claim 13, wherein the processor is configured to adaptively segmenting the landing zone candidate region based on the aircraft status.

19. The system of claim 13, wherein the processor is configured to identify at least one of a visual feature or a depth feature in the segmented regions.

20. The system of claim 13, wherein the processor is configured to identify at least one of a color, a texture, and an appearance from the segmented regions.

21. The system of claim 13, wherein the processor is configured to identify at least one of a slope, a residual of fitting, and a variance of height from the segmented regions.

22. The system of claim 13, wherein the processor is configured to determine a suitable landing zone from the prioritized ranked semantic classes.

23. The system of claim 13, wherein the processor is configured to prioritize the semantic classes based on one of priority or suitability.

* * * * *